Patented July 21, 1953

2,646,424

UNITED STATES PATENT OFFICE 2,646,424

ACRYLONITRILE COMPOSITIONS AND PROCESS FOR MAKING THE SAME

Henry W. Wehr and Floyd B. Nagle, Midland, Mich., assignors to The Dow Chemical Company, Midland, Mich., a corporation of Delaware No Drawing. Application May 25, 1951, Serial No. 228,353

7 Claims. (Cl. 260—85.5)

This invention relates to polymers and copolymers of acrylonitrile and to a method for polymerizing the same. It particularly concerns a method and agents for regulating the polymerization reaction in the preparation of homopolymers of acrylonitrile and copolymers consisting principally of acrylonitrile.

Homopolymers of acrylonitrile and copolymers containing predominant amounts of chemically combined acrylonitrile and methods of making the same are well known. It is known that such polymerization reactions are strongly exothermic. When attempt is made to polymerize acrylonitrile in mass, i. e. in the substantial absence of inert liquid media, an extremely vigorous exothermic polymerization reaction occurs. The temperature of the mass may rise to the boiling point of the mixture so that much of the monomeric material is lost, or the reaction may take place abruptly and with almost explosive violence. The occurrence of an extremely vigorous exothermic or "runaway" polymerization reaction results in discoloring of the polymeric product at elevated temperatures, and in a product of non-uniform composition because of the relatively poor control of the polymerization reaction.

It is an object of the invention to provide a method and agents for regulating the polymerization reaction in the preparation of homopolymers of acrylonitrile and copolymers containing predominant amounts of chemically combined acrylonitrile. Another object is to provide a method and agents for the polymerization of acrylonitrile either alone or in mixture in principal amount with at least one other copolymerizable monoethylenically unsaturated organic compound containing a single carbon to carbon double bond in the molecule so as to avoid the tendency toward the occurrence of an extremely vigorous exothermic or runaway polymerization reaction. Still another object is to provide modifying agents for controlling the molecular weight of the polymers and copolymers obtained by the polymerization of acrylonitrile either alone or in admixture in predominant amount with at least one other copolymerizable monoethylenic compound. Other and related objects will become apparent from the following description of the invention.

According to the invention, the foregoing and related objects are obtained by polymerizing acrylonitrile either alone or in mixture with not more than 30 per cent by weight of at least one other copolymerizable monoethylenic compound, e. g. vinylidene chloride, in the presence of an unsaturated dimer of a monomeric alpha-alkyl aromatic compound having the general formula:

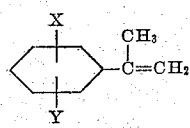

wherein each of the symbols X and Y represents the same or different members of the group consisting of hydrogen, halogens and lower alkyl radicals containing not more than three carbon atoms. For convenience, the alpha-alkyl-vinyl aromatic compounds having the above formula are hereinafter referred to as "alpha-alkyl styrenes."

By incorporating a small amount, suitably 2 per cent by weight or less, of an unsaturated dimer of a monomeric alpha-alkyl styrene as just mentioned with monomeric acrylonitrile, or with an acrylonitrile composition wherein the polymerizable portion is at least 70 per cent by weight acrylonitrile, and polymerizing the same in any usual way, e. g. in mass, the tendency toward the occurrence of an extremely vigorous exothermic polymerization reaction is not only suppressed, but the polymerization occurs so as to form a polymeric product composed for the most part of polymer molecules having a relatively narrow range of molecular weights. The effect of an unsaturated dimer of an alpha-methyl styrene in causing a reduction in the average molecular weight of the polymer, and in suppressing the tendency toward the occurrence of an extremely vigorous exothermic polymerization reaction results in the formation of polymeric products which have improved molding and fiber forming characteristics and better color than is obtained in the absence of such dimer under otherwise similar polymerization conditions. The polymeric products prepared in accordance with the invention also have greater solubility in usual solvents for homopolymers of acrylonitrile such as N,N-dimethyl formamide than have polymers prepared in the absence of said unsaturated dimer modifying agent under otherwise similar polymerization conditions.

The unsaturated dimers of a monomeric alpha-alkyl styrene having the aforementioned formula, which are employed as regulators or modifying agents for the polymerization of acrylonitrile compositions may be prepared in accordance with procedure described in United States Patent 2,429,719. Examples of suitable monomeric alpha-alkyl styrenes from which the corresponding unsaturated dimers may be prepared are alpha-methyl styrene, para-methyl-alpha-methyl styrene, meta-methyl-alpha-methyl styrene, para-ethyl-alpha-methyl styrene, para-isopropyl-alpha-methyl styrene, ar-dimethyl-alpha-methyl styrene, ar-chloro-alpha-methyl styrene, 3,4-dichloro-alpha-methyl styrene, ar-chloro-ar-methyl-alpha-methyl styrene, ar-diethyl-alpha-methyl styrene, and ar-isopropyl-ar-methyl-alpha-methyl styrene.

It may be mentioned that the olefinic product obtained by the dimerization, i. e. the reaction of two molecules of an alpha-alkyl styrene with each other, is usually a mixture of the corresponding isomeric 1-pentene and 2-pentene derivatives which are difficult to separate from each other in usual ways, e. g. by distillation. For instance, the monoolefinic product obtained by dimerizing alpha-methyl styrene, i. e. by reacting two molecules of alpha-methyl styrene with each other, usually consists of a mixture of the isomeric compounds 2,4-diphenyl-4-methyl-2-pentene and 2,4-diphenyl-4-methyl-1-pentene. The latter compound has an effect of causing a more pronounced lowering of the molecular weight of the polymer formed by polymerizing acrylonitrile than has a like amount of the compound 2,4-diphenyl-4-methyl-2-pentene under otherwise similar polymerization conditions. However, both of the unsaturated dimers of alpha-methyl styrene are effective polymerization modifying agents for regulating the molecular weight of the polymeric product, obtained by the polymerization of acrylonitrile compositions, and for controlling the polymerization reaction, so that mixtures of the isomeric unsaturated dimers may satisfactorily be used. The unsaturated dimers of the alpha-alkyl styrenes are usually employed as a liquid composed principally of a mixture of the corresponding isomeric derivatives of 1-pentene and 2-pentene, together with a minor proportion, e. g. 15 per cent by weight or less, of the corresponding saturated or cyclic dimer of the monomeric alpha-alkyl styrene, although the unsaturated dimers may be used in pure or substantially pure form. The unsaturated dimer or mixture of unsaturated dimers may be used in amount of from 0.1 to 2 per cent, preferably from 0.25 to 1.5 per cent, by weight of the polymerizable starting materials, the amount used depending in part upon other reaction conditions. In general, the amount of the modifier should be increased with increasing polymerization temperature, other factors being constant. For instance, if 0.1 per cent of the unsaturated dimers of alpha-methyl styrene is sufficient at polymerization temperatures of from 30° to 50° C., as much as 2 per cent may be required to control the reaction at polymerization temperatures of from 80° to 100° C.

The unsaturated dimers of an alpha-alkyl styrene as hereinbefore mentioned are used as modifiers or control agents in the polymerization of acrylonitrile either alone or in mixtures containing not more than 30 per cent of at least one other monoethylenically unsaturated compound, i. e. a vinyl or vinylidene compound, which is copolymerizable with acrylonitrile. Examples of such copolymerizable vinyl and vinylidene compounds are vinyl chloride, vinylidene chloride, styrene, ar-methyl styrene, alpha-methyl styrene, para-methyl-alpha-methyl styrene, methyl isopropenyl ketone, vinyl naphthalene, methyl methacrylate, methacrylonitrile, ethyl methacrylate, and vinyl acetate.

Except for the requirement that one or more of the unsaturated dimers of an alpha-alkyl styrene be present, the polymerization or copolymerization of the acrylonitrile may be carried out in any usual way, e. g. by heating the polymerizable composition in mass in the presence of the unsaturated dimers only, or in an aqueous emulsion. Catalysts for the polymerization such as benzoyl peroxide, acetylbenzoyl peroxide, di-tertiary-butyl peroxide, tertiary-butyl hydroperoxide or tertiary-butyl perbenzoate are employed in bulk polymerization. For polymerizations carried out in aqueous emulsion catalysts such as hydrogen peroxide, or ammonium and potassium persulfate are usually employed.

In practice the unsaturated dimers of an alpha-alkyl styrene are mixed with the polymerizable starting materials, e. g. acrlyonitrile, in the desired proportion prior to effecting the polymerization. The polymeric product is frequently obtained in a form suitable for the intended use, but when necessary is treated in any usual way to obtain the same in the desired form. For instance, when the polymerization has been carried out in mass volatile ingredients are usually vaporized from the product by heating the same in vacuum and the product is thereafter cooled and cut or ground to a suitable form. When the polymerization has been carried out in aqueous emulsion, the product is coagulated in any usual way, e. g. by adding any of a variety of agents such as sodium chloride, hydrochloric acid or aluminum sulfate, which are capable of causing coagulation, and the product is separated from the liquor and is washed and dried.

The following examples illustrate ways in which the principle of the invention has been applied, but are not to be construed as limiting the invention.

EXAMPLE 1

In each of a series of experiments, an emulsion was prepared by mixing 100 grams of acrylonitrile and unsaturated dimer of alpha-methyl styrene in amount as stated in the following table, with 200 grams of water containing 2 grams of Aerosol MA (dihexyl ester of sodium sulfosuccinic acid) as emulsifying agent and 0.5 gram of potassium persulfate as polymerization catalyst. Each mixture was sealed in a glass bottle and was agitated and heated to a temperature of 60° C. for a period of 8 hours. The polymer slurry was removed from the bottle, was separated by filtering and was washed with water and dried. A viscosity characteristic for each polymer was determined. The procedure in determining the viscosity characteristic was to dissolve a portion of the product in N,N-dimethyl formamide to form a solution containing 0.5 gram of the material in 100 cc. of the solvent at 25° C. and determine the absolute viscosity in centipoises of the solution. Table I identifies each polymeric product by giving the relative proportions of acrylonitrile and unsaturated dimer of alpha-methyl styrene in parts by weight used in preparing the same. The table also gives the polymerization time and temperature conditions, the per cent polymer and a viscosity characteristic for each polymer. For purpose of comparison acrylonitrile polymerized under the same temperature conditions, but in the absence of the unsaturated dimer of alpha-methyl styrene is also included in the table.

Table I

| Run No. | Starting Materials | | Polymerization Conditions | | Products | |
|---|---|---|---|---|---|---|
| | Acrylonitrile, Parts | Unsaturated Dimer of Alpha-Methyl Styrene, Parts | Time, Hrs. | Temp., °C. | Percent Polymer | Viscosity, cps. |
| 1 | 100 | 0 | 4 | 60 | 93.8 | 10.220 |
| 2 | 100 | 0.1 | 8 | 60 | 98.3 | 5.001 |
| 3 | 100 | 1.0 | 8 | 60 | 24.3 | 2.518 |

EXAMPLE 2

A mixture of 12 grams of acrylonitrile and 0.24 gram of unsaturated dimer of alpha-methyl styrene, together with 0.5 per cent by weight of benzoyl peroxide as polymerization catalyst was sealed in a glass tube and heated for one hour in an oil bath maintained at a temperature of 100° C. The tube was removed from the bath and cooled. The product was removed from the tube and dried in an oven at a temperature of 60° C. for a period of 16 hours. There was obtained 3.86 grams of polymer. The yield of product was 32 per cent. A portion of the polymer was tested to determine a viscosity characteristic as described in Example 1. The polymer had a viscosity characteristic of 1.398 centipoises.

For purpose of comparison a charge of 8.03 grams of acrylonitrile, together with 0.5 per cent by weight of benzoyl peroxide was sealed in a glass tube and heated for 5 minutes in the oil bath maintained at a temperature of 100° C., then removed and cooled. The product was removed from the tube and was dried in the same way as described above. There was obtained 3.0 grams of polymer. The yield of product was 37.3 per cent. A viscosity characteristic for the polymer was determined as described in Example 1. The polymer had a viscosity characteristic of 1.670 centipoises, whereas the polymer prepared in the presence of the unsaturated dimer of alpha-methyl styrene had a viscosity characteristic of 1.398 centipoises.

EXAMPLE 3

In each of two comparative experiments acrylonitrile was polymerized by heating the same in a closed container. In experiment A 12 grams of acrylonitrile, together with 0.06 gram of benzoyl peroxide and 0.12 gram of unsaturated dimers of alpha-methyl styrene, was sealed in a glass tube and heated at a temperature of 80° C. for a time of 90 minutes. The polymer was removed from the tube and dried in vacuum. There was obtained 9.43 grams of a pale yellow powder. It was soluble in N,N-dimethyl formamide.

In experiment B 12 grams of acrylonitrile, together with 0.06 gram of benzoyl peroxide was sealed in a glass tube and heated at a temperature of 80° C. for a time of 5 minutes. A vigorous polymerization reaction occurred. The polymer was removed form the tube and dried in vacuum. There was obtained 5.36 grams of a yellow powder. It was only partly soluble in N,N-dimethyl formamide.

EXAMPLE 4

A mixture of 240 grams of acrylonitrile and 60 grams of vinylidene chloride, together with 0.75 gram of benzoyl peroxide as polymerization catalyst and 2.25 grams of unsaturated dimers of alpha-methyl styrene (a liquid boiling at 315–329° C. at 760 millimeters absolute pressure, having an index of refraction $n_D^{25}=1.5686$ and a specific gravity of 0.9860 at 25° C.) was sealed in a stainless steel tube and was heated for a period of 5 hours by immersing the tube in a water bath maintained at a temperature of 90° C. Thereafter, the tube was cooled and the polymer slurry removed and dried by heating the same in vacuum at a temperature of 60° C. under an absolute pressure of about 10 millimeters for a period of 16 hours. There was obtained 90 grams of nearly white powdery product. It was analyzed and found to contain 14.85 per cent by weight of chlorine. A viscosity characteristic for the polymer was determined by dissolving a portion of the product in N,N-dimethyl formamide to form a solution containing 0.5 gram of the material in 100 cc. of the N,N-dimethy formamide at 25° C. and determining the absolute viscosity in centipoises of the solution. The polymer had a viscosity characteristic of 1.80 centipoises.

A portion of the product was dissolved in N,N-dimethyl formamide to form a solution containing 10 weight per cent of the material. The solution was cast onto a glass plate and dried to form a film approximately 0.5 mil thick. The film was removed from the plate and a strip of the film having a width between 0.125 and 0.25 inch was heated to a temperature of 250° F. and oriented by simultaneously twisting and stretching the same to about seven times its original length. The film split into fine filaments. The filaments had a tensile strength value corresponding to from 2.5–3 grams per denier and a per cent elongation value of from 9–10 per cent.

Other modes of applying the principle of the invention may be employed instead of those explained, change being made as regards the steps or the compounds herein disclosed provided the steps or compounds stated in any of the following claims or the equivalent of such steps or compounds be employed.

We claim:

1. In a process for making a polymer of acrylonitrile by polymerizing an acrylonitrile composition wherein the polymizerable portion is composed of at least one monoethylenically unsaturated organic compound and is at least 70 per cent by weight acrylonitrile, the improvement which consists in carrying out the polymerization in the presence of from 0.1 to 2 per cent by weight of the polymerizable materials, of an unsaturated dimer of a monomeric alpha-alkyl styrene having the formula:

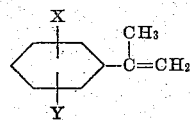

wherein X and Y each represents a member of the group consisting of hydrogen, halogens and lower alkyl radicals containing not more than three carbon atoms.

2. In a process for making a homopolymer of acrylonitrile, the improvement which consists in polymerizing acrylonitrile in the presence of from 0.1 to 2 per cent by weight of an unsaturated dimer of a monomeric alpha-alkyl styrene having the formula:

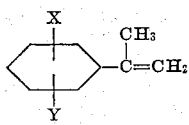

wherein X and Y each represents a member of the group consisting of hydrogen, halogens and lower alkyl radicals containing not more than three carbon atoms.

3. In a process for making a polymer of acrylonitrile by polymerizing an acrylonitrile composition wherein the polymerizable portion is composed of monoethylenically unsaturated organic compounds and is at least 70 per cent by weight acrylonitrile, the improvement which consists in carrying out the polymerization in the presence of from 0.1 to 2 per cent by weight of the polymerizable materials, of an unsaturated dimer of alpha-methyl styrene.

4. In a process for making a polymer of acrylonitrile by polymerizing an acrylonitrile composition wherein the polymerizable portion is composed of monoethylenically unsaturated organic compounds and is at least 70 per cent by weight acrylonitrile, the improvement which consists in carrying out the polymerization in the presence of from 0.1 to 2 per cent by weight of the polymerizable materials, of an unsaturated dimer of ar-methyl-alpha-methyl styrene.

5. In a process for making a polymer of acrylonitrile by polymerizing an acrylonitrile composition wherein the polymerizable portion is composed of monoethylenically unsaturated organic compounds and is at least 70 per cent by weight acrylonitrile, the improvement which consists in carrying out the polymerization in the presence of from 0.1 to 2 per cent by weight of the polymerizable materials, of an unsaturated dimer of ar-dimethyl-alpha-methyl styrene.

6. In a process for making a homopolymer of acrylonitrile, the improvement which consists in polymerizing acrylonitrile in the substantial absence of an inert liquid medium and in the presence of from 0.1 to 2 per cent by weight of an unsaturated dimer of alpha-methyl styrene.

7. In a process for making a polymer of acrylonitrile by polymerizing an acrylonitrile composition wherein the polymerizable portion is composed of at least 70 per cent by weight of acrylonitrile together with lesser amounts of vinylidene chloride, the improvement which consists in carrying out the polymerization in the substantial absence of an inert liquid medium and in the presence of from 0.1 to 2 per cent by weight based on the weight of the polymerizable materials, of an unsaturated dimer of alpha-methyl styrene.

HENRY W. WEHR.
FLOYD B. NAGLE.

References Cited in the file of this patent
UNITED STATES PATENTS

| Number | Name | Date |
|---|---|---|
| 2,489,959 | Dunlap | Nov. 29, 1949 |